(12) United States Patent
Yamaguchi et al.

(10) Patent No.: US 6,511,932 B2
(45) Date of Patent: Jan. 28, 2003

(54) GRADED INDEX LENS (75) Inventors: Jun Yamaguchi, Osaka (JP); Shigeo Kittaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 102 days.

(21) Appl. No.: 09/726,517

(22) Filed: Dec. 1, 2000

(65) Prior Publication Data

US 2001/0003724 A1 Jun. 14, 2001

(30) Foreign Application Priority Data

Dec. 1, 1999 (JP) .......................... 11-342598

(51) Int. Cl.[7] .................. C03C 3/095; C03C 15/00; G02B 3/00
(52) U.S. Cl. .............. 501/63; 501/55; 501/64; 501/65; 501/66; 501/67; 501/68; 65/30.13; 359/652; 359/653; 359/654
(58) Field of Search .................. 501/63, 64, 66, 501/67, 69, 72, 77, 78, 73, 900; 359/440, 652, 653, 654; 428/410

(56) References Cited

U.S. PATENT DOCUMENTS

| 4,092,174 A | 5/1978 | Ellis et al. ............. 106/53 |
| 4,405,672 A | 9/1983 | Araujo et al. ............. 428/68 |
| 4,495,299 A | 1/1985 | Noguchi et al. ............. 501/72 |
| 6,066,273 A | * 5/2000 | Yamaguchi et al. ........ 252/584 |

FOREIGN PATENT DOCUMENTS

EP   0 918 235 A2   5/1999

OTHER PUBLICATIONS

European Search Report.

* cited by examiner

*Primary Examiner*—David Sample
*Assistant Examiner*—Elizabeth A. Bolden
(74) *Attorney, Agent, or Firm*—Sughrue Mion, PLLC (57) ABSTRACT A graded index lens is obtained by treating a raw glass material having a rod shape by ion exchange using silver to form a refractive index distribution in the radial direction of the rod, wherein the raw glass material comprises a glass composition of the following components:

$15 < Na_2O \leq 30$ mol %;
$10 < Al_2O_3 \leq 25$ mol %;
$27.5 \leq SiO_2 \leq 55$ mol %;
$3 \leq B_2O_3 \leq 18$ mol %;
$2.5 \leq MgO \leq 18$ mol %;
$0 \leq Ta_2O_5 \leq 5$ mol %;
$0 \leq La_2O_3 \leq 3$ mol %;
$0 \leq BaO \leq 3$ mol %; and
$0 \leq ZrO_2 \leq 3$ mol %.

5 Claims, 8 Drawing Sheets

EXAMPLE 1

EXAMPLE 4

FIG. 5B

EXAMPLE 5

FIG. 6

EXAMPLE 6

FIG. 7

EXAMPLE 1

GRADED INDEX LENS

BACKGROUND OF THE INVENTION

1. Field of the Invention

The present invention relates to a refractive index distribution type lens (hereinafter referred to as a graded index lens) in which the refractive index changes along the radial direction for the rod lens. More particularly, the invention relates to a graded index lens obtained by treating a raw glass material by ion exchange using silver to form a refractive index distribution in the radial direction.

2. Description of the Related Art

A refractive index distribution type optical element in which the refractive index parabolically changes in a section thereof from the center along the radii has the same image-forming function as spherical lenses even when both sides thereof are flat. Since this type of optical element has advantages, for example, that a lens having a small diameter and a short focal distance can be easily produced, it is extensively used in optical heads for copiers, printers, facsimile telegraphs, and the like and in other applications. Such refractive index distribution type optical elements include graded index lenses and refractive index distribution type fibers.

The glasses of the related art which are produced through drawing and a subsequent step of ion exchange conducted by immersion in molten salts and are for use as refractive index distribution type optical elements (e.g., lenses) include the following three main kinds: (1) thallium-containing glasses, (2) cesium-containing glasses, and (3) lithium-containing glasses.

The thallium-containing glasses can give graded index lenses having an extremely large angular aperture because they have high electronic polarizability. However, these lenses have enhanced chromatic aberration and, hence, cannot be used especially in optical systems dealing with color images.

The cesium-containing glasses have reduced chromatic aberration unlike the thallium-containing glasses. However, since it is impossible to incorporate a large amount of cesium into a glass, the lenses obtained from the cesium-containing glasses are limited to those having a small angular aperture. In addition, these glasses have a drawback that they have an exceedingly high melting temperature.

The lithium-containing glasses have reduced chromatic aberration and a moderate melting temperature and are hence used extensively. However, since glasses containing a large amount of lithium ions are highly apt to devitrify, a graded index lens having a large angular aperture cannot be produced therefrom.

Lenses having a large angular aperture are therefore produced from the thallium-containing glasses. However, since thallium is toxic, production of the glasses containing a large amount of thallium and use of a molten salt containing a large amount of thallium are undesirable from the standpoint of environmental pollution.

Besides the ions shown above, silver ions are thought to contribute to the attainment of a large difference in refractive index as shown in JP-A-61-261238 and JP-A-62-100451. (The term "JP-A" as used herein means an "unexamined published Japanese patent application".) Silver ions are advantageous from the standpoint of producing a lens dealing with color images because use of silver results in reduced chromatic aberration as compared with the case of using thallium. Since silver ions are generally apt to become colloidal, the references cited above propose a glass composition containing a large amount of a phosphorus component in order to inhibit silver ions from forming a colloid.

However, such glasses containing a large amount of a phosphorus component have poor weatherability and insufficient suitability for practical use. The glasses containing a large amount of a phosphorus component further have problems that the glasses during ion exchange react with a nitrate to yield a devitrification product on the glass surface and that the glasses themselves partly dissolve in the molten salt. When a melt of a salt other than nitrates, e.g., a melt of a sulfate or halide, is used, there is a problem that since such a melt highly corrodes metals and glasses, an appropriate container for holding the molten salt is not easily available.

An improvement of the glass composition proposed in JP-A-62-100451 is the glass composition disclosed in JP-A-4-2629. However, this glass composition also is still insufficient in stability in molten salts and weatherability and is hence unsuitable for practical use.

On the other hand, an aluminosilicate glass is known as a glass composition which contains no phosphorus components and in which silver ions do not form a colloid. In general, incorporation of an alkali into a silicate glass cleaves the silicate framework to form nonbridging oxygen (hereinafter referred to as "NBO") strongly bonded to alkali ions. When a glass in which NBO is present is subjected to ion exchange to incorporate silver ions thereinto, then the silver ions incorporated are reduced by the NBO to form a silver colloid and thereby color the glass. Consequently, such a glass cannot be used as a lens.

In contrast, when $Al_2O_3$ is added to a silicate glass, the $Al_2O_3$ is incorporated in the form of $AlO_4^-$ and bonded to an alkali. Because of this, the amount of NBO in the glass is reduced and silver ions are apt to be present stably in the ion form. Since $AlO_4^-$ bonds to an alkali ion in a proportion of 1:1, the amount of NBO in the glass is minimum (becomes zero in some glasses) when [M]/[Al] is 1 ([M] and [Al] represent the molar concentrations of the alkali ion and $AlO_4^-$, respectively, in the glass). Consequently, the glasses in which silver ions are contained most stably are the glasses in which [M]/[Al] is 1.

Incidentally, for increasing the angular aperture of a lens having a radial distribution of refractive index, it is necessary to increase the radial difference in refractive index. Refractive index difference is almost proportional to the concentration of silver ions. In order for a glass to have an increased angular aperture, it should therefore contain a large amount of an alkali to be replaced by silver ions. For enabling silver ions to be stably present in an aluminosilicate glass, it is necessary to increase the concentration of $Al_2O_3$ as the alkali concentration in the glass is increased. However, glasses having an increased $Al_2O_3$ concentration have an elevated melting temperature and, hence, glass products of satisfactory quality (free from striae, bubbles, etc.) are difficult to produce therefrom. Although a technique of reducing the $Al_2O_3$ concentration in the glass may be used for lowering the melting temperature, this results in a reduced amount of silver ions capable of being contained without forming a colloid, making it impossible to obtain a large difference in refractive index.

It is known that incorporation of $B_2O_3$ into a glass is effective in lowering the melting temperature while inhibiting silver ions from forming a colloid (*Glastech Ber.*, 64 [8] 199(1991); *Appl. Opt.*, 31 [25] 5221(1992); *J. Non-Cryst. Solids*, 113 37(1989)). (In glasses, boron is trivalent like aluminum.) However, too high a concentration of $B_2O_3$ in a glass poses problems that the glass has reduced durability and the rate of ion exchange of silver ions is low. Consequently, the concentration of $B_2O_3$ which can be incorporated is limited.

In JP-A-4-219341 are given BeO, CaO, $Ga_2O_3$, $La_2O_3$, MgO, $Nb_2O_3$, $Ta_2O_3$, $Yb_2O_3$, ZnO, and $ZrO_2$ as ingredients which can be used, besides $B_2O_3$, in place of $Al_2O_3$ while inhibiting silver ions from forming a colloid. However, there is no description therein concerning whether the replacement lowers the melting temperature or not.

As described above, none of the techniques of the related art has succeeded in providing a high-quality lens which has a radial distribution of refractive index with a large radial difference in refractive index and has fully satisfactory properties.

SUMMARY OF THE INVENTION

An object of the invention, which eliminates the problems of the techniques of the related art described above, is to provide a highly durable, excellent lens which has a radial distribution of refractive index required for optical designs and which has satisfactory quality, i.e., which is produced from a glass composition having a low melting temperature and a rate of ion exchange sufficient for practical use and enabling silver ions to be stably present in the glass.

The invention provides a graded index lens obtained by treating a raw glass material by ion exchange using silver to form in the raw glass material a refractive index distribution in the radial direction, the raw glass material being constituted of a glass composition comprising the following components:

15<$Na_2O$≦30 mol %,
10<$Al_2O_3$≦25 mol %,
27.5≦$SiO_2$≦55 mol %,
3≦$B_2O_3$≦18 mol %,
2.5≦MgO≦18 mol %,
0≦$Ta_2O_5$≦5 mol %,
0≦$La_2O_3$≦3 mol %,
0≦BaO≦3 mol %, and
0≦$ZrO_2$≦3 mol %.

Namely, according to the invention, by incorporating MgO into an aluminoborosilicate glass, the melting temperature of the glass can be lowered while maintaining high durability and silver ions can be stably incorporated in the form of ions into the glass. As a result, a lens having a necessary radial distribution of refractive index is realized.

It is known that polyvalent ions generally serve to considerably reduce the rate of diffusion of monovalent ions. However, it has been reported that MgO and ZnO give polyvalent ions which relatively less reduce the rate of ion exchange (R. H. Doremus, "Glass Science 2nd. ed." p.278, John Wiley & Sons) and that these polyvalent ions may diminish NBO in glasses (*Appl. Opt.*, 31 [25] 5221(1992)).

However, experiments made by the present inventors revealed that when ZnO is incorporated into an aluminoborosilicate glass, phase separation occurs in the glass. Incorporation of MgO did not result in such phase separation at all.

The present inventors have found that the object of the invention can be accomplished by incorporating MgO into an aluminoborosilicate glass as a glass composition for use as a raw glass material from which a lens having a radial distribution of refractive index is to be produced. The invention has been thus completed.

In the invention, the glass composition is preferably as follows.

18≦$Na_2O$≦30 mol %
15≦$Al_2O_3$≦25 mol %
30≦$SiO_2$≦50 mol %
5≦$B_2O_3$≦18 mol %
3≦MgO≦15 mol %
0≦$Ta_2O_5$≦3 mol %
0≦$La_2O_3$≦3 mol %
0≦BaO≦3 mol %
0≦$ZrO_2$≦3 mol %

The glass composition in the invention is more preferably as follows.

20≦$Na_2O$≦30 mol %
15≦$Al_2O_3$≦22.5 mol %
30≦$SiO_2$≦45 mol %
7≦$B_2O_3$≦15 mol %
5≦MgO≦12.5 mol %
0≦$Ta_2O_5$≦3 mol %
0≦$La_2O_3$≦3 mol %
0≦BaO≦3 mol %
0≦$ZrO_2$≦3 mol %

DETAILED DESCRIPTION OF THE INVENTION

Modes for carrying out the invention will be explained below.

Firsts an explanation is given on the glass composition of the raw glass material for use in the invention.

If the concentration of MgO contained in the glass composition is lower than 2.5 mol %, the effect of lowering the melting temperature and thereby giving a glass of satisfactory quality is insufficient. Concentrations of MgO exceeding 18 mol % are impractical because such a high MgO concentration results in poor stability of silver ions in the glass. Consequently, the concentration of MgO is $2.5 \leq MgO \leq 18$ mol %, preferably $3 \leq MgO \leq 15$ mol %, more preferably $5 \leq MgO \leq 12.5$ mol %.

The optimal alkali ions to be replaced by silver ions which form a refractive index distribution are sodium ions, which have a high coefficient of mutual diffusion with silver ions and can be replaced by silver ions in a short ion exchange time. If the concentration of sodium ions is 15 mol % or lower, a required difference in refractive index cannot be obtained. If the concentration thereof exceeds 30 mol %, the glass has reduced durability and is unsuitable for practical use. Consequently, the concentration of $Na_2O$ is $15 < Na_2O \leq 30$ mol %, preferably $18 \leq Na_2O \leq 30$ mol %, more preferably $20 \leq Na_2O \leq 30$ mol %.

$Al_2O_3$ is an essential ingredient which is necessary for enabling silver ions to be stably contained in the glass. As stated above, [Na]/[Al] is desirably 1 from the standpoint of eliminating NBO in the glass. In the invention, however, the incorporation of $B_2O_3$ and MgO into the glass enables silver ions to be stably contained in the glass even when [Na]/[Al] is not 1.

Too high concentrations of $Al_2O_3$ result in too high a melting temperature and hence in difficulties in producing glass products of satisfactory quality. Consequently, the concentration of $Al_2O_3$ is $10 < Al_2O_3 \leq 25$ mol %, preferably $15 \leq Al_2O_3 \leq 25$ mol %, more preferably $15 \leq Al_2O_3 \leq 22.5$ mol %.

$B_2O_3$ serves to lower the melting temperature of the glass to facilitate the production of glass products of satisfactory quality. $B_2O_3$ is effective also in preventing the glass from developing cracks upon ion exchange. However, if the concentration of $B_2O_3$ is lower than 3 mol %, these effects are insufficient. If the concentration thereof exceeds 18 mol %, the glass has reduced durability and is unsuitable for practical use. Consequently, the concentration of $B_2O_3$ is $3 \leq B_2O_3 \leq 18$ mol %, preferably $5 \leq B_2O_3 \leq 18$ mol %, more preferably $7 \leq B_2O_3 \leq 15$ mol %.

$SiO_2$ is the main component which forms the network structure of the glass. If the concentration of $SiO_2$ is lower than 27.5 mol %, the glass has considerably reduced chemical durability. If the concentration thereof exceeds 55 mol %, not only the content of the oxide contributing to the formation of a refractive index distribution and the contents of other oxides are limited but also the glass has too high a melting temperature, making it difficult to obtain glass products of satisfactory quality. Consequently, the concentration of $SiO_2$ is $27.5 \leq SiO_2 \leq 55$ mol %, preferably $30 \leq SiO_2 \leq 50$ mol %, more preferably $30 \leq SiO_2 \leq 45$ mol %.

$Ta_2O_5$ can be added in the invention for the purpose of modifying the refractive index and refractive index distribution of the mother glass and thereby increasing the degree of freedom of lens design. However, too high concentrations of $Ta_2O_5$ in the glass pose problems that the rate of replacement between silver ions and sodium ions becomes low and phase separation occurs in the glass. Consequently, the concentration of $Ta_2O_5$ is 5 mol % or lower, preferably 3 mol % or lower.

$La_2O_3$ and BaO also can be added, like $Ta_2O_5$, for the purpose of modifying the refractive index and refractive index distribution of the mother glass. However, $La_2O_3$ and BaO have problems that these ingredients are more effective than $Ta_2O_5$ in lowering the rate of replacement between silver ions and sodium ions and that too high concentrations of $La_2O_3$ and BaO result in phase separation in the glass. Consequently, the concentration of $La_2O_3$ and that of BaO each is 3 mol % or lower.

$ZrO_2$ can be added in the invention in order to improve the durability of the mother glass. However, too high concentrations of $ZrO_2$ in the glass pose problems that the glass has too high a melting temperature and the rate of replacement between silver ions and sodium ions is too low. Consequently, the concentration of $ZrO_2$ is desirably 3 mol % or lower.

Furthermore, $Nb_2O_5$, $Sb_2O_3$, $WO_3$, and $Y_2O_3$ can be added as long as the addition thereof does not adversely influence the properties of the lens having a radial distribution of refractive index to be produced. The amounts of these ingredients based on the total amount of the main ingredients described above maybe as follows: $0 \leq Nb_2O_5 \leq 3$ mol %, $0 \leq Sb_2O_3 \leq 1$ mol %, $0 \leq WO_3 \leq 1$ mol %, and $0 \leq Y_2O_3 \leq 1$ mol %.

Glasses obtained were evaluated for durability (water resistance and acid resistance). For this evaluation was used the powder method which is a standard method employed by Japan Optical Glass Industry Association.

The lens having a radial distribution of refractive index of the invention is produced by the following method. First, a cylindrical raw glass material formed from the glass composition described above is subjected to ion exchange, for example, by immersing it in a molten salt to thereby replace all the alkali ions contained in the glass by silver ions. Examples of the molten salt for use in this treatment include a melt of a salt mixture comprising from 5 to 30 mol % silver nitrate and from 95 to 70 mol % sodium nitrate and a melt of a salt mixture comprising from 50 to 100 mol % silver chloride, from 0 to 50 mol % zinc chloride, and from 0 to 30 mol % silver sulfide. However, from the standpoint of corrosiveness, it is preferred to use the molten salt mixture containing silver nitrate. Conditions for this treatment are suitably selected in the temperature range of from 300 to 420° for molten salt mixtures containing silver nitrate or from 450 to 550° C. for molten salt mixtures containing silver chloride and in the treatment period range of from 3 to 30 days.

The glass rod in which all the alkali ions have been replaced by silver ions is subjected to ion exchange, for example, by immersing again the rod in a molten salt to form in the glass a distribution of silver ion concentration and thereby form a parabolic distribution of refractive index. Examples of the molten salt for use in this treatment include sodium nitrate and sodium chloride. However, from the standpoint of corrosiveness, it is preferred to use molten sodium nitrate. Conditions for this treatment with molten sodium nitrate are suitably selected in the temperature range of from 350 to 500° C. and in the treatment period range of from 1 to 20 days.

The graded index lens produced was evaluated for optical properties, i.e., refractive index distribution and spherical aberration. The evaluation methods used are as follows.

The refractive index distribution in a lens having a radical distribution of refractive index can be expressed by the following equation:

$$n(r)^2 = n_0^2 \cdot \{1 - (g \cdot r)^2 + h_4 \cdot (g \cdot r)^4 + h_6 \cdot (g \cdot r)^6 + \ldots\}$$

wherein
- r is distance from the optical axis,
- n(r) is refractive index as measured in a position apart from the optical axis at the distance r,
- $n_0$ is refractive index as measured on the optical axis,
- $r_0$ is radius of the effective part of the lens,
- g is second order coefficient of refractive index distribution, and
- $h_4, h_6, \ldots$ are fourth, sixth, ... order coefficients of refractive index.

The refractive index distribution of the lens produced was roughly determined through calculation from the distribution of silver concentration in the following manner. The refractive index $n_0$ of the center of the lens and the refractive index of a peripheral part of the lens were measured, and the radial distribution of silver concentration in the lens was determined with an X-ray microanalyzer. The refractive index distribution in the lens was calculated on the assumption that the refractive index distribution was proportional to the silver concentration distribution.

Figure 1:
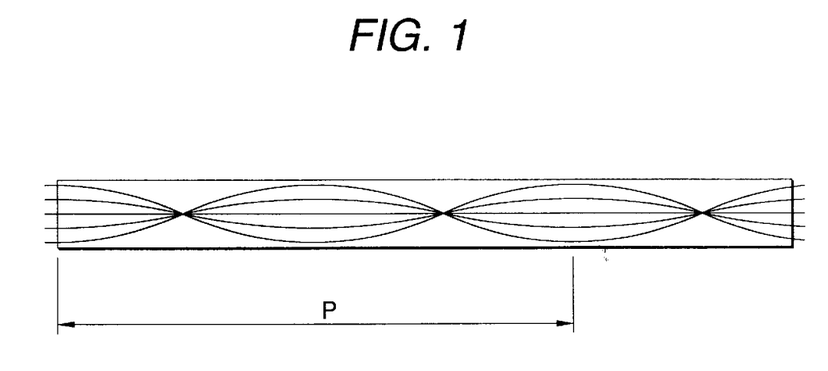
FIG. 1 is a diagrammatic view illustrating light beams passing through a graded index lens.

Light beams incident on the rod-form lens in parallel with the optical axis periodically weave through the lens as shown in FIG. 1. The length of one period P in a paraxial region is defined by the following equation.

$$P = 2\pi/g$$

When the length of the rod-form lens is regulated to P/4, parallel rays incident on one end of the lens can be converged at the other end.

Figure 2:
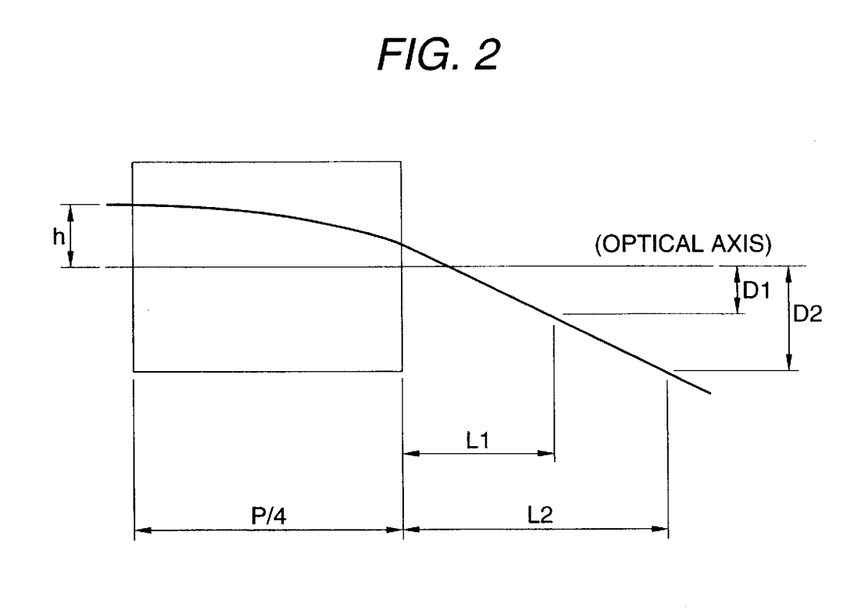
FIG. 2 is a view illustrating a method for determining longitudinal spherical aberration.

The longitudinal spherical aberration of the rod obtained (length, P/4) was determined by the following method (see FIG. 2).

(1) The length of the rod lens is taken as P/4.

(2) A He—Ne laser beam (wavelength, 632.8 nm) is caused to strike on one end of the lens in parallel with the optical axis at a position apart from the optical axis at a distance of h.

(3) The distances $D_1$ and $D_2$ between the laser beam center and the optical axis are measured in positions apart from the other end of the lens at distances of $L_1$ and $L_2$, respectively.

(4) The value of spherical aberration SA for the light beam height h is calculated from $L_1$, $L_2$, $D_1$, and $D_2$.

The invention will be explained below in detail by reference to Examples and Comparative Examples, but the invention should not be construed as being limited to the following Examples unless the invention departs from the spirit thereof.

EXAMPLE 1

A glass material having the composition shown in Table 1 was melted by heating at 1,450° C. in a platinum crucible and then cast.

The durability of this glass was evaluated by the powder method. As a result, the water resistance and acid resistance thereof were in the second degree and third degree, respectively. These results showed that the incorporation of MgO into the glass improves rather than impairs durability.

A glass rod having a diameter of 25 mm was cut out of the glass block obtained. This rod was heated and drawn to thereby produce a glass rod having a diameter of 1 mm. This rod was immersed for 6 days in a 400° C. molten salt mixture composed of 20 mol % silver nitrate and 80 mol % sodium nitrate to replace sodium ions contained in the glass by silver ions present in the molten salts. The degree of replacement in this treatment was 98%.

This glass was treated by immersing it for 16 hours in a 400° C. molten salt consisting of sodium nitrate only. Thus, a lens having a radial distribution of refractive index was obtained.

Figure 3:
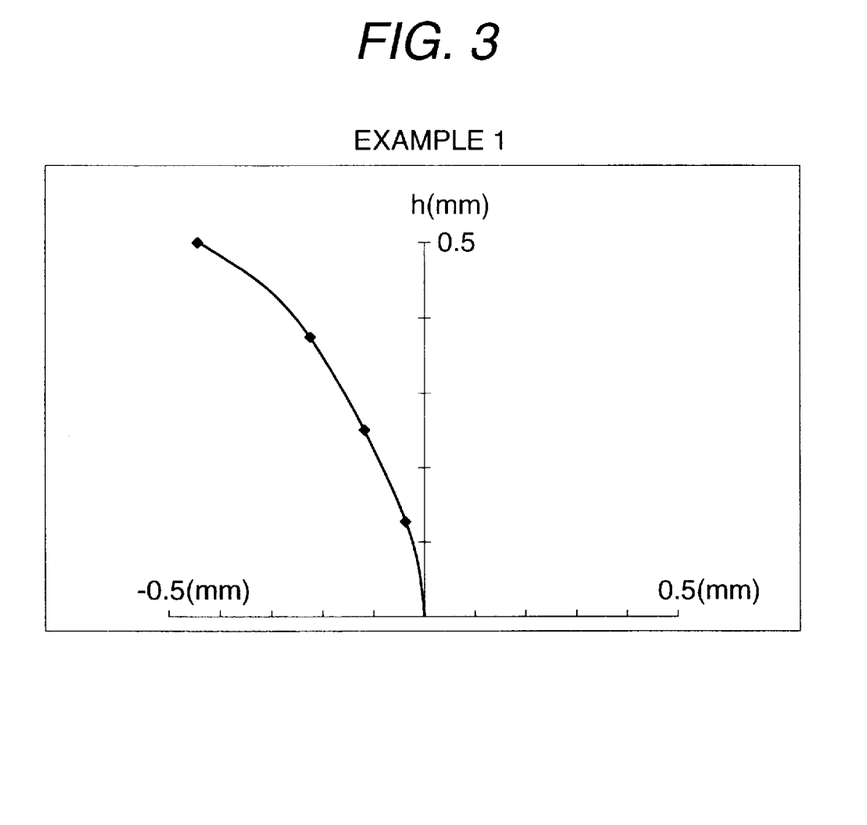
FIG. 3 is a graphic presentation showing the refractive index distribution of the graded index lens obtained in Example 1.

The refractive index distribution of this lens was determined by the method described above and was found to be nearly parabolic as shown in FIG. 3. This refractive index distribution was ascertained to be suitable for a lens having a radial distribution of refractive index.

Figure 7:
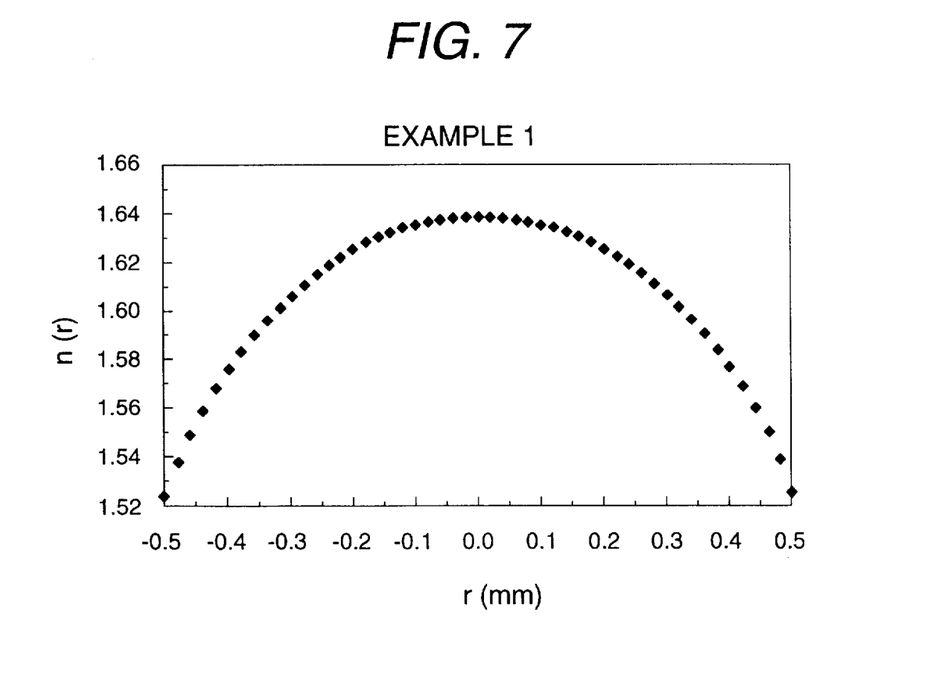
FIG. 7 is a graphic presentation showing the longitudinal spherical aberration of the graded index lens obtained in Example 1.

Results of optical evaluations of this lens are given in Table 2, which shows the values of $n_0$ and g as determined at a wavelength of 632.8 nm, and in FIG. 7, which shows the results of determination of longitudinal spherical aberration.

EXAMPLES 2 AND 3

Glass materials having respective compositions differing in MgO concentration from the glass composition of Example 1 as shown in Table 1 (MgO was added in place of $B_2O_3$ in Example 2 and in place of $Al_2O_3$ in Example 3) were melted by heating at 1,450° C. and 1,400° C., respectively, in a platinum crucible and then cast.

The glasses obtained were evaluated for durability by the powder method. As a result, the water resistance and acid resistance of each glass were both in the second degree. These glasses thus showed higher weatherability.

A glass rod having a diameter of 25 mm was cut out of each glass block obtained. This rod was heated and drawn to thereby produce a glass rod having a diameter of 1 mm. This rod was immersed in a 360° C. molten salt mixture composed of 20 mol % silver nitrate and 80 mol % sodium nitrate for 10 days (Example 2) or 11 days (Example 3) to replace sodium ions contained in the glass by silver ions present in the molten salts. The degrees of replacement in this treatment were 94% (Example 2) and 95% (Example 3).

This glass was treated by immersion in a molten salt consisting of sodium nitrate only at 400° C. for 17.5 hours in Example 2 or at 380° C. for 22 hours in Example 3. Thus, lenses having a radial distribution of refractive index were obtained.

Figure 4A:
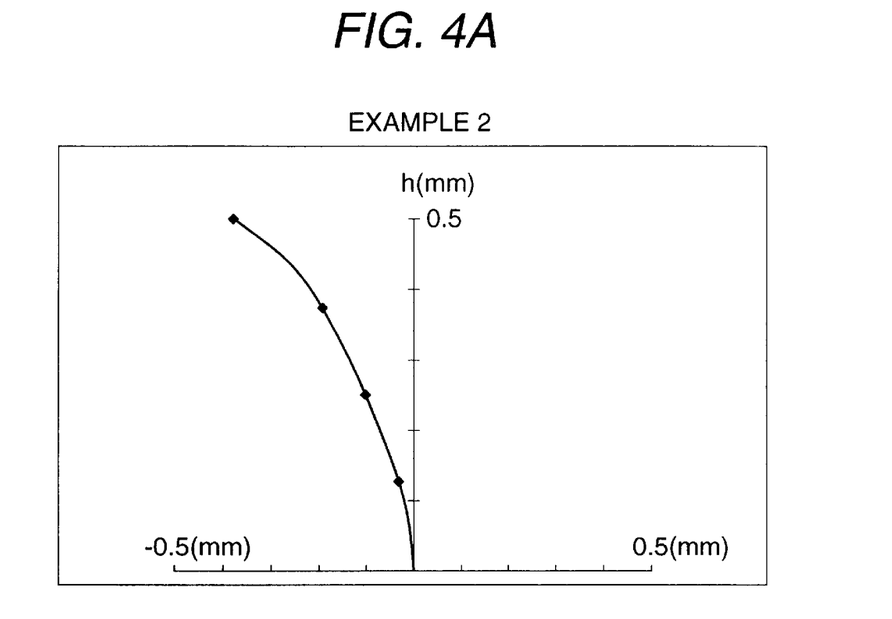
FIGS. 4A and 4B are graphic presentations respectively showing the refractive index distributions of the graded index lenses obtained in Examples 2 and 3.
Figure 4B:
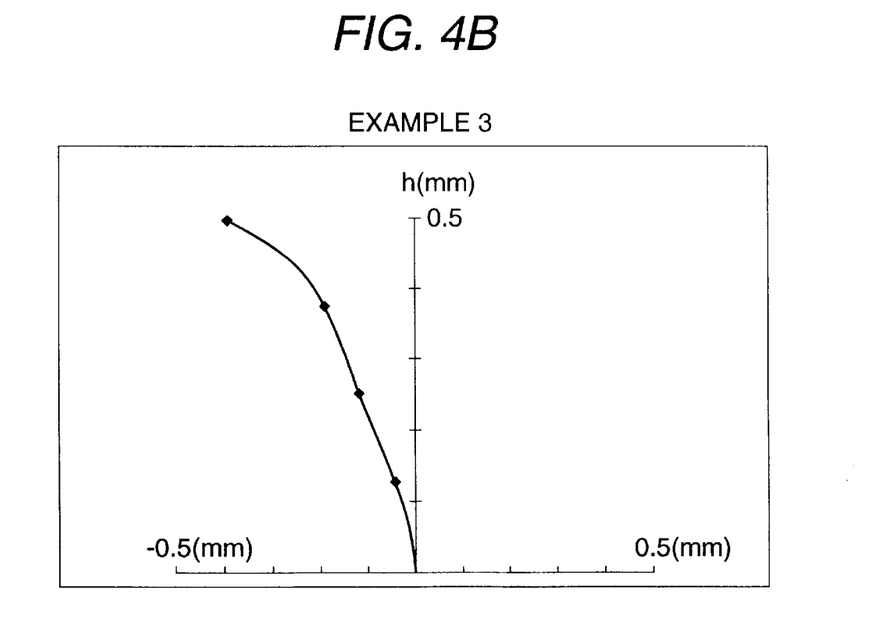
Figure 8A:
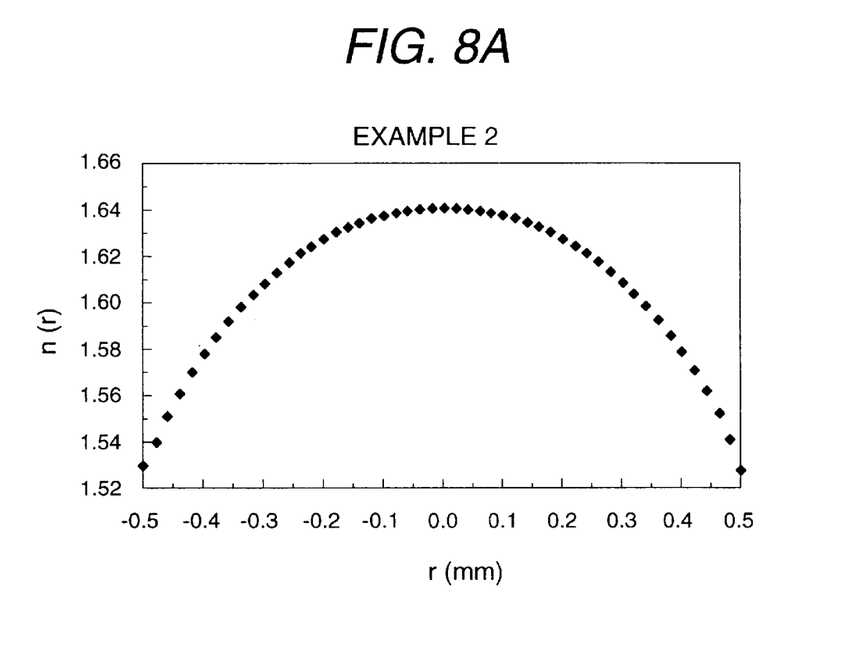
FIGS. 8A and 8B are graphic presentations respectively showing the longitudinal spherical aberrations of the graded index lenses obtained in Examples 2 and 3.
Figure 8B:
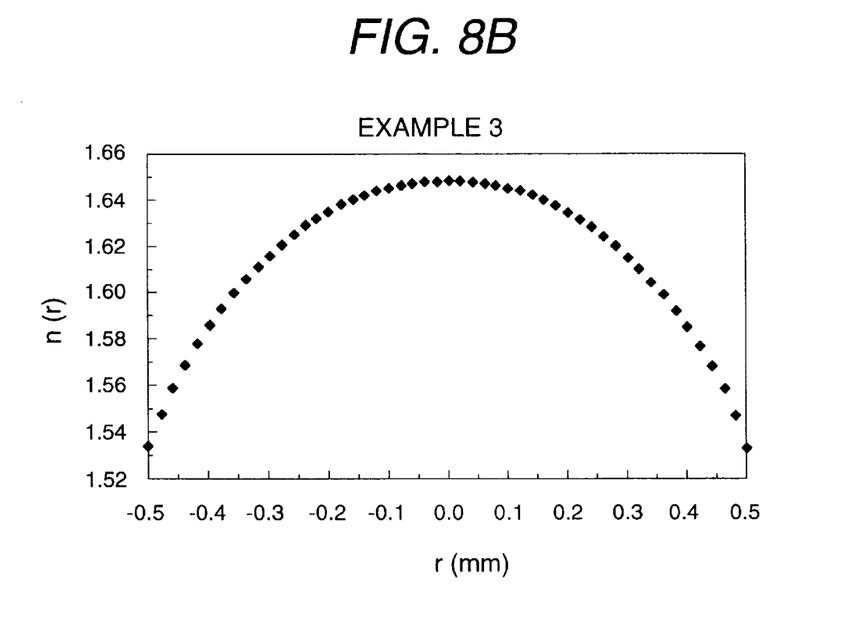

The refractive index distributions thus formed were nearly parabolic like that obtained in Example 1, as shown in FIGS. 4A (Example 2) and 4B (Example 3). These refractive index distributions were ascertained to be suitable for a lens having a radial distribution of refractive index. The values of $n_0$ and g and the longitudinal spherical aberration were determined in the same manner as in Example 1 and are shown in Table 2 and FIGS. 8A (Example 2) and 8B (Example 3), respectively.

EXAMPLES 4 AND 5

Glass materials having respective compositions differing in $Na_2O$ concentration from the glass composition of Example 1 as shown in Table 1 were melted by heating at 1,450° C. (Example 4) and 1425° C. (Example 5), respectively, in a platinum crucible and then cast.

The glasses obtained were evaluated for durability by the powder method. As a result, the water resistance and acid resistance of the glass obtained in Example 4 were both in the second degree, and those of the glass obtained in Example 5 were both in the third degree.

A glass rod having a diameter of 25 mm was cut out of each glass block obtained. This rod was heated and drawn to thereby produce a glass rod having a diameter of 1 mm. This rod was immersed in a 360° C. molten salt mixture composed of 20 mol % silver nitrate and 80 mol % sodium nitrate for 13 days (Example 4) or 10 days (Example 5) to replace sodium ions contained in the glass by silver ions present in the molten salts. The degrees of replacement in this treatment were 91% (Example 4) and 96% (Example 5).

This glass was treated by immersion in a molten salt consisting of sodium nitrate only at 420° C. for 14 hours in Example 4 or at 440° C. for 8.5 hours in Example 5. Thus, lenses having a radial distribution of refractive index were obtained.

Figure 5A:
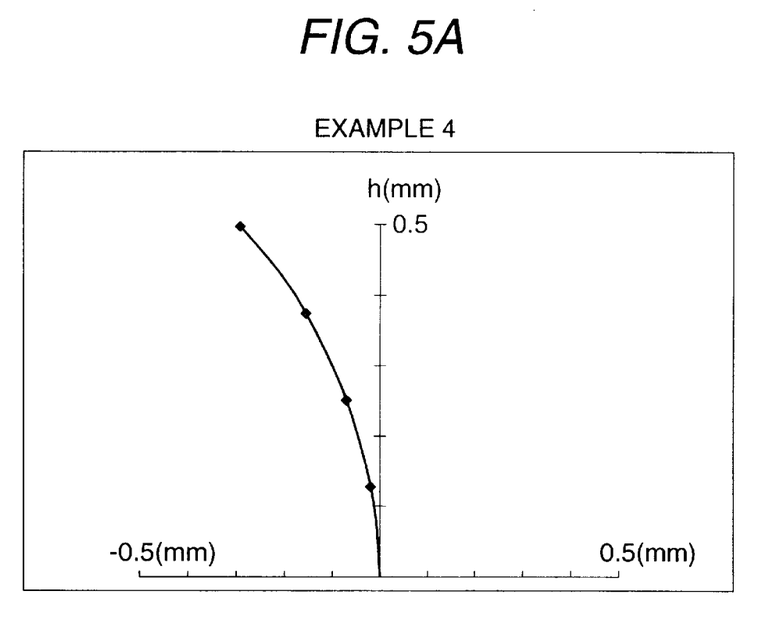
FIGS. 5A and 5B are graphic presentations respectively showing the refractive index distributions of the graded index lenses obtained in Examples 4 and 5.
Figure 5B:
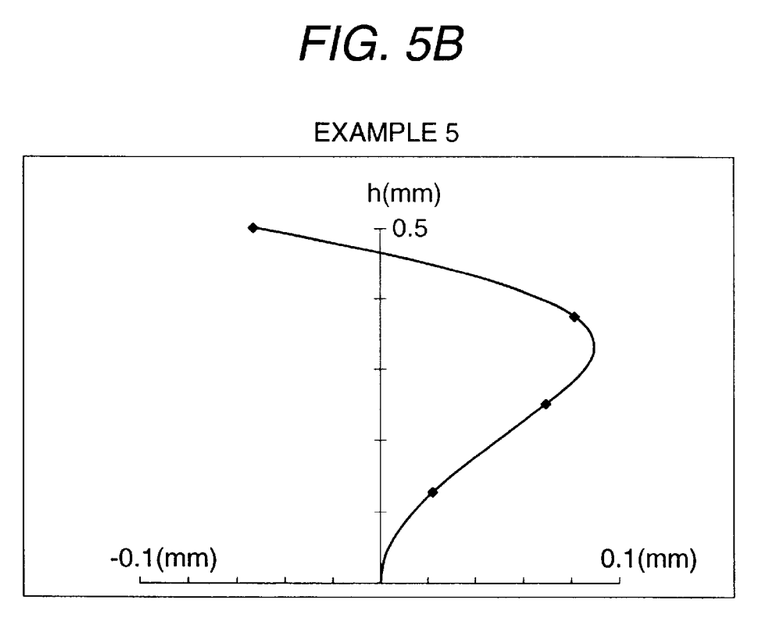
Figure 9A:
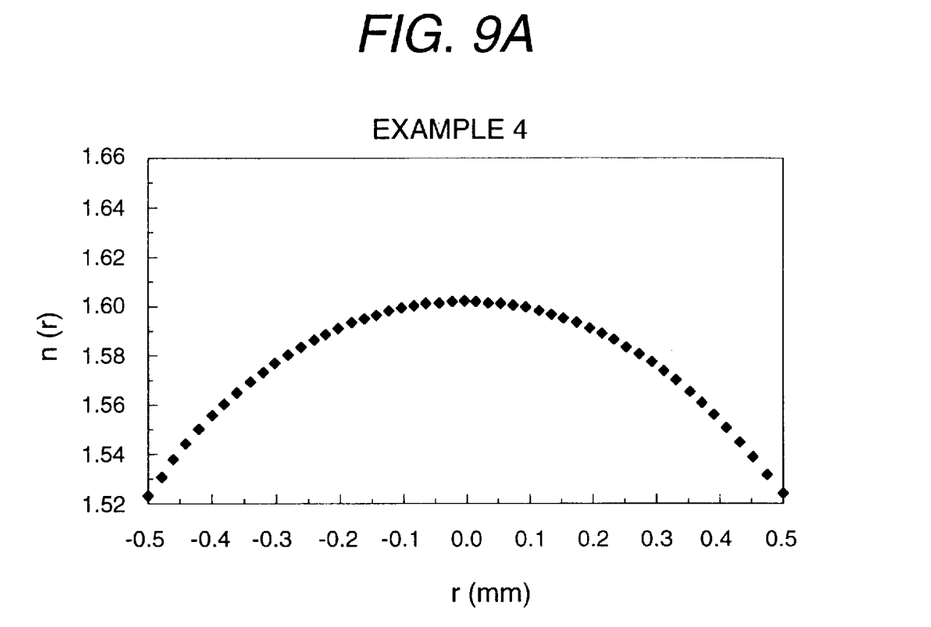
FIGS. 9A and 9B are graphic presentations respectively showing the longitudinal spherical aberrations of the graded index lenses obtained in Examples 4 and 5.
Figure 9B:
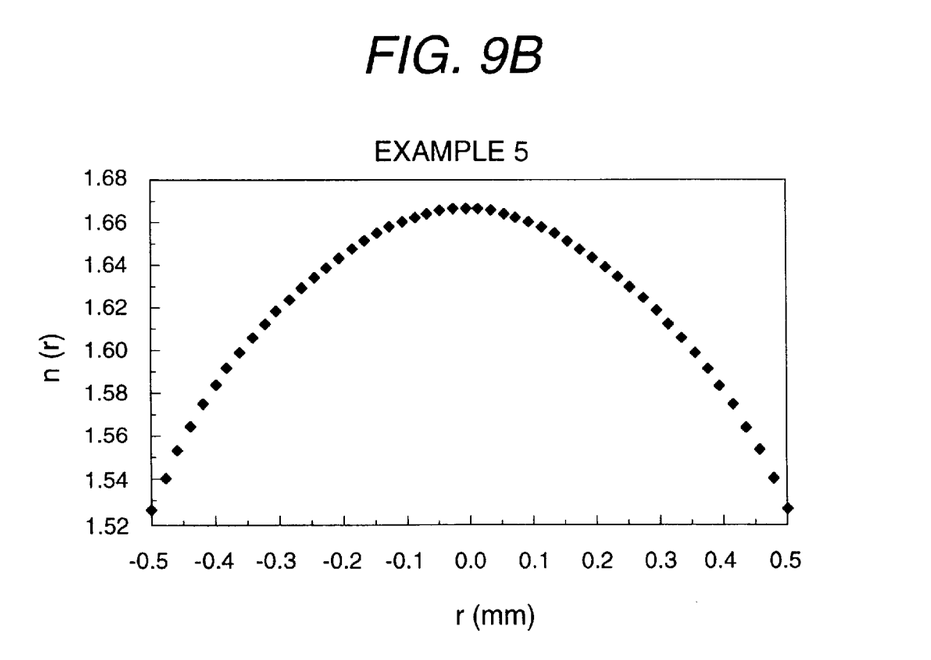

The refractive index distributions thus formed were nearly parabolic like that obtained in Example 1, as shown in FIGS. 5A (Example 4) and 5B (Example 5). The values of $n_0$ and g and the longitudinal spherical aberration are shown in Table 2 and FIGS. 9A (Example 4) and 9B (Example 5), respectively. The lens obtained in Example 5 had a slightly larger value of g than the others.

EXAMPLE 6

Figure 10:
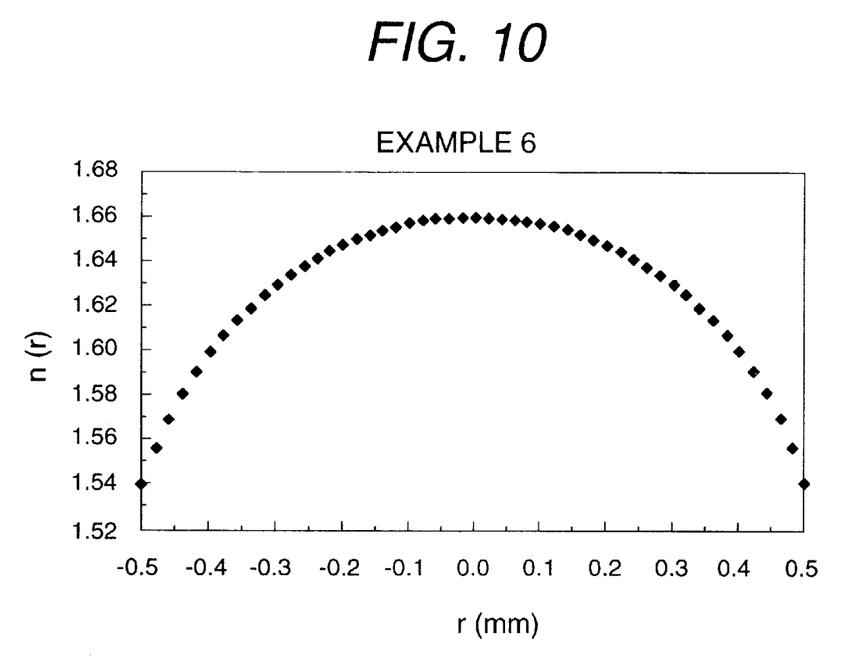
FIG. 10 is a graphic presentation showing the longitudinal spherical aberration of the graded index lens obtained in Example 6.

A glass material having a composition differing from the glass composition of Example 1 in that it further contained $Ta_2O_5$ as a refractive index modifier as shown in Table 1 bution of refractive index. The values of $n_0$ and g and the longitudinal spherical aberration are shown in Table 2 and FIG. 10, respectively.

COMPARATIVE EXAMPLES 1 AND 2

Raw glasses respectively having the compositions shown in Table 1 were melted in a platinum crucible and then cast. The temperatures required for this melting were 1,550° C. (Comparative Example 1) and 1,525° C. (Comparative Example 2), which were higher by from 100 to 150° C. than the temperatures used for melting in the Examples.

The glasses obtained were evaluated for durability by the powder method. As a result, the water resistance and acid resistance of each glass were both in the third degree. These glasses thus showed lower durability than the glasses obtained in the Examples.

TABLE 1

| Composition | | Example | | | | | | Comparative Example | |
|---|---|---|---|---|---|---|---|---|---|
| (mol %) | | 1 | 2 | 3 | 4 | 5 | 6 | 1 | 2 |
| $Na_2O$ | | 25 | 25 | 25 | 20 | 30 | 25 | 25 | 25 |
| $Al_2O_3$ | | 20 | 20 | 15 | 15 | 20 | 18 | 25 | 23 |
| MgO | | 5 | 7.5 | 10 | 5 | 10 | 5 | | 2 |
| $B_2O_3$ | | 12.5 | 10 | 10 | 15 | 10 | 12.5 | 12.5 | 12.5 |
| $SiO_2$ | | 37.5 | 37.5 | 40 | 45 | 30 | 37.5 | 37.5 | 37.5 |
| $Ta_2O_5$ | | | | | | | 2 | | |
| Total | | 100 | 100 | 100 | 100 | 100 | 100 | 100 | 100 |
| Dura- | Acid | 2 | 2 | 2 | 2 | 3 | 2 | 3 | 3 |
| bil- | resistance | | | | | | | | |
| ity | Water | 3 | 2 | 2 | 2 | 3 | 3 | 3 | 3 |
| | resistance | | | | | | | | |
| Temperature required for melting (° C.) | | 1450 | 1450 | 1400 | 1450 | 1425 | 1425 | 1550 | 1525 |

($Ta_2O_5$ was added in place of $Al_2O_3$) was melted by heating at 1,425° C. in a platinum crucible and then cast.

The refractive index of the glass obtained was higher by 0.02 than that in Example 1.

The glass obtained was evaluated for durability by the powder method. As a result, the water resistance and acid resistance of the glass were in the second degree and the third degree, respectively.

A glass rod having a diameter of 25 mm was cut out of the glass block obtained. This rod was heated and drawn to thereby produce a glass rod having a diameter of 1 mm. This rod was immersed in a 400° C. molten salt mixture composed of 20 mol % silver nitrate and 80 mol % sodium nitrate for 9 days to replace sodium ions contained in the glass by silver ions present in the molten salts. The degree of replacement in this treatment was 93%.

This glass was treated by immersion in a molten salt consisting of sodium nitrate only at 360° C. for 26 hours. Thus, a lens having a radial distribution of refractive index was obtained.

Figure 6:
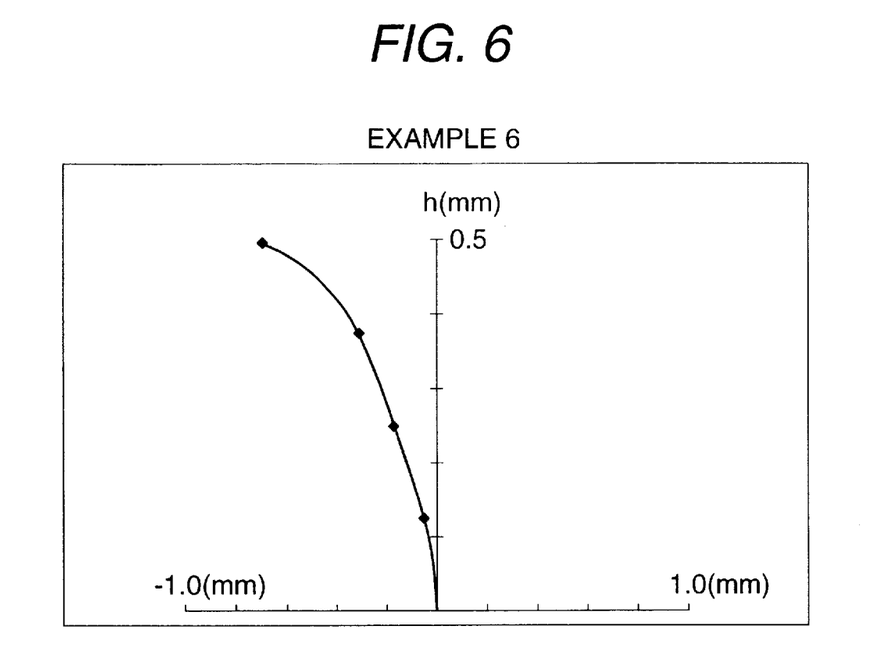
FIG. 6 is a graphic presentation showing the refractive index distribution of the graded index lens obtained in Example 6.

The refractive index distribution of the lens thus obtained was nearly parabolic like that formed in Example 1, as shown in FIG. 6. This refractive index distribution was ascertained to be suitable for a lens having a radial distri-

TABLE 2

| | $n_0$ | g (1/mm) |
|---|---|---|
| Example 1 | 1.6383 | 0.613 |
| Example 2 | 1.6403 | 0.628 |
| Example 3 | 1.6488 | 0.632 |
| Example 4 | 1.6013 | 0.562 |
| Example 5 | 1.6668 | 0.855 |
| Example 6 | 1.6583 | 0.568 |

As described above, it has become possible, according to the invention, to provide a high-quality lens having a radial distribution of refractive index by incorporating MgO into an aluminoborosilicate glass in a given proportion. This lens has a refractive index distribution required for optical designs and has high properties including satisfactory durability. The raw glass material from which the lens is produced has a low melting temperature and a rate of ion exchange sufficient for practical use and enables silver ions to be stably present therein.

The entire disclosure of each and every foreign patent application from which the benefit of foreign priority has been claimed in the present application is incorporated herein by reference, as if fully set forth.

We claim:

1. A graded index lens having a radial refractive index gradient obtained by treating a raw glass material having a rod shape by ion exchange using silver to form a refractive index distribution in the radial direction of the rod, wherein the raw glass material comprises a glass composition of the following components:

$15 < Na_2O \leq 30$ mol %;
$10 < Al_2O_3 \leq 25$ mol %;
$27.5 \leq SiO_2 \leq 55$ mol %;
$3 \leq B_2O_3 \leq 18$ mol %;
$2.5 \leq MgO \leq 18$ mol %;
$0 \leq Ta_2O_5 \leq 5$ mol %;
$0 \leq La_2O_3 \leq 3$ mol %;
$0 \leq BaO \leq 3$ mol %; and
$Q \leq ZrO_2 \leq 3$ mol %.

2. The graded index lens having a radial refractive index gradient of claim 1, wherein the glass composition comprises the following components:

$18 \leq Na_2O \leq 30$ mol %;
$15 \leq Al_2O_3 \leq 25$ mol %;
$30 \leq SiO_2 \leq 50$ mol %;
$5 \leq B_2O_3 \leq 18$ mol %;
$3 \leq MgO \leq 15$ mol %;
$0 \leq Ta_2O_5 \leq 3$ mol %;
$0 \leq La_2O_3 \leq 3$ mol %;
$0 \leq BaO \leq 3$ mol %; and
$0 \leq ZrO_2 \leq 3$ mol %.

3. The graded index lens having a radial refractive index gradient of claim 1, wherein the glass composition comprises the following components:

$20 \leq Na_2O \leq 30$ mol %;
$15 \leq Al_2O_3 \leq 22.5$ mol %;
$30 \leq SiO_2 \leq 45$ mol %;
$7 \leq B_2O_3 \leq 15$ mol %;
$5 \leq MgO \leq 12.5$ mol %;
$0 \leq Ta_2O_5 \leq 3$ mol %;
$0 \leq La_2O_3 \leq 3$ mol %;
$0 \leq BaO \leq 3$ mol %; and
$0 \leq ZrO_2 \leq 3$ mol %.

4. The graded index lens having a radial refractive index gradient of claim 1, wherein the glass composition further comprises the following components:

$0 \leq Nb_2O_5 \leq 3$ mol %;
$0 \leq Sb_2O_3 \leq 1$ mol %;
$0 \leq WO_3 \leq 1$ mol %; and
$0 \leq Y_2O_3 \leq$ mol %, based on 100 mol % of the total of $Na_2O$, Al2O3, $SiO_2$, $B_2O_3$, MgO, $Ta_2O_5$, $La_2O_3$, BaO, and $ZrO_2$.

5. The graded index lens having a radial refractive index of claim 1, wherein the refractive index of the lens decreases with increasing distance from the center of the lens in the radial direction.

* * * * *